US012321476B2

(12) United States Patent
Trivedi et al.

(10) Patent No.: US 12,321,476 B2
(45) Date of Patent: *Jun. 3, 2025

(54) SYSTEM AND METHOD FOR VALIDATING A RESPONSE BASED ON CONTEXT INFORMATION

(71) Applicant: Bank of America Corporation, Charlotte, NC (US)

(72) Inventors: Abhishek Trivedi, Hyderabad (IN); Shruti Nandini Thakur, Hyderabad (IN); Nimish Ravindra Deshpande, Mumbai (IN); Prashant Khare, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,598

(22) Filed: Apr. 29, 2024

(65) Prior Publication Data

US 2024/0281552 A1    Aug. 22, 2024

Related U.S. Application Data

(63) Continuation of application No. 17/677,070, filed on Feb. 22, 2022, now Pat. No. 12,013,958.

(51) Int. Cl.
G06F 21/62 (2013.01)
(52) U.S. Cl.
CPC .................. G06F 21/6218 (2013.01)
(58) Field of Classification Search
None
See application file for complete search history.

(56) References Cited

U.S. PATENT DOCUMENTS

| 8,316,237 B1 | 11/2012 | Felsher et al. |
| 9,697,820 B2 | 7/2017 | Jeon |
| 9,734,169 B2 | 8/2017 | Redlich et al. |

(Continued)

FOREIGN PATENT DOCUMENTS

| CN | 107729999 B | 2/2018 |
| EP | 2745244 A2 | 6/2014 |

(Continued)

OTHER PUBLICATIONS

Trivedi, Abhishek, "System and Method for Determining Context Changes in Text," U.S. Appl. No. 17/677,259, filed Feb. 2, 2022, 50 pages.

*Primary Examiner* — William J. Goodchild

(57) ABSTRACT

A system for validating a response based on context information receives a first message that indicates that a data object is removed from a memory resource via a third party device without authorization by a user. The system communicates a second response that indicates whether a third party confirms the removal of the data object without the authorization by the user to the third party device. The system receives a response from the third party device. The system extracts context information from the response. The system determines whether the response is valid based on the context information. In response to determining that the response is valid, the system recommends one or more actions to be performed with respect to the memory resource.

20 Claims, 5 Drawing Sheets

(56) References Cited

U.S. PATENT DOCUMENTS

| | | |
|---|---|---|
| 9,842,106 B2 | 12/2017 | Hori et al. |
| 10,042,961 B2 | 8/2018 | Zou et al. |
| 10,127,901 B2 | 11/2018 | Zhao et al. |
| 10,169,315 B1 | 1/2019 | Heckel et al. |
| 10,264,081 B2 | 4/2019 | He et al. |
| 10,268,671 B2 | 4/2019 | Kaiser et al. |
| 10,298,757 B2 | 5/2019 | Guggilla et al. |
| 10,354,182 B2 | 7/2019 | Chang et al. |
| 10,409,908 B2 | 9/2019 | Vinyals et al. |
| 10,546,393 B2 | 1/2020 | Ray et al. |
| 10,671,936 B2 | 6/2020 | Bouveyron et al. |
| 10,679,613 B2 | 6/2020 | Wabgaonkar et al. |
| 10,812,424 B1 | 10/2020 | Bommaraju et al. |
| 11,010,559 B2 | 5/2021 | Zhao et al. |
| 11,023,680 B2 | 6/2021 | Almosallam et al. |
| 11,128,680 B2 | 9/2021 | Nawrocki |
| 11,134,150 B1 | 9/2021 | Maestas |
| 11,153,242 B2 | 10/2021 | Mei et al. |
| 2007/0006321 A1* | 1/2007 | Bantz .................. G06F 21/6218 726/27 |
| 2008/0147452 A1 | 6/2008 | Renz et al. |
| 2010/0005511 A1* | 1/2010 | Maes .................... G06F 21/335 726/4 |
| 2010/0174813 A1 | 7/2010 | Hildreth et al. |
| 2011/0321151 A1* | 12/2011 | Gluck .................. H04L 63/102 726/11 |
| 2015/0106311 A1 | 4/2015 | Birdwell et al. |
| 2017/0131864 A1 | 5/2017 | Edgar |
| 2017/0140240 A1 | 5/2017 | Socher |
| 2017/0147682 A1 | 5/2017 | Alaqeeli et al. |
| 2017/0213138 A1 | 7/2017 | Bojja et al. |
| 2017/0308790 A1 | 10/2017 | Nogueira Dos Santos et al. |
| 2017/0322923 A1 | 11/2017 | Dixon et al. |
| 2018/0025726 A1 | 1/2018 | Gatti De Bayser et al. |
| 2018/0089152 A1 | 3/2018 | Maksak et al. |
| 2018/0150744 A1 | 5/2018 | Orr et al. |
| 2018/0329884 A1 | 11/2018 | Xiong et al. |
| 2018/0349327 A1 | 12/2018 | Yang et al. |
| 2019/0138599 A1 | 5/2019 | Sen et al. |
| 2019/0197107 A1 | 6/2019 | Lin et al. |
| 2019/0318318 A1 | 10/2019 | Sergott et al. |
| 2019/0349321 A1 | 11/2019 | Cai et al. |
| 2020/0065391 A1 | 2/2020 | Dewan |
| 2020/0076749 A1* | 3/2020 | Deluca .................. H04L 51/224 |
| 2020/0081983 A1 | 3/2020 | Alam et al. |
| 2020/0159778 A1 | 5/2020 | Mohanty et al. |
| 2020/0177403 A1 | 6/2020 | Vazquez-Rivera et al. |
| 2020/0342183 A1 | 10/2020 | Kalchbrenner et al. |
| 2020/0388143 A1 | 12/2020 | Williams, II et al. |
| 2021/0027020 A1 | 1/2021 | Shen et al. |
| 2021/0042469 A1 | 2/2021 | Saito et al. |
| 2021/0209474 A1 | 7/2021 | Duan et al. |
| 2021/0326860 A1 | 10/2021 | Jagga et al. |

FOREIGN PATENT DOCUMENTS

| | | |
|---|---|---|
| JP | 2016106299 A | 6/2016 |
| WO | 2019228082 A1 | 12/2019 |

* cited by examiner

SYSTEM AND METHOD FOR VALIDATING A RESPONSE BASED ON CONTEXT INFORMATION

CROSS-REFERENCE TO RELATED APPLICATION

The application is a continuation of U.S. patent application Ser. No. 17/677,070, filed Feb. 22, 2022, entitled "SYSTEM AND METHOD FOR VALIDATING A RESPONSE BASED ON CONTEXT INFORMATION," which is incorporated herein by reference.

TECHNICAL FIELD

The present disclosure relates generally to data security, and more specifically to a system and method for validating a response based on context information.

BACKGROUND

It is challenging to determine context information from text. The current text processing approaches perform a lot of computationally-intensive calculations to determine or predict the context information of the text. Therefore, the current text processing approaches are bulky and consume a lot of processing and memory resources.

SUMMARY

The system described in the present disclosure is particularly integrated into a practical application of improving the data security technology. This, in turn, provides a technical advantage of data loss prevention and securing data from unauthorized access.

As such, the technology disclosed in the present disclosure improves the underlying operations of computing devices used to store and maintain the data. These practical applications and technical advantages are described below.
Validating a Response Based on Context Information The present disclosure contemplates systems and methods configured to validate a response based on context information. In an example scenario, assume that a user sends a message to a validation device, where the message indicates that a data object is removed from a memory resource associated with the user without authorization of the user.

The validation device identifies a third party device via which the data object was removed. The third party device is associated with a third party. The validation device sends a message to the third party device to confirm whether the third party removed the data object from the memory resource without the authorization of the user. The validation device receives a response from the third party device.

In some cases, the response may not address the message sent from the validation device. For example, the response may be automatically-generated, only comprises an acknowledgment message (i.e., only acknowledging a receipt of the message), is associated with another data object, is associated with another memory resource, and/or is associated with another user. These examples of the response may be referred to as invalid responses. In such cases, the validation device may not be able to proceed to resolve the issue of the missing data object. In contrast, a valid response is a response that is actionable—meaning that the validation device is able to proceed to resolve the issue of the missing data object.

The validation device determines whether the response is valid or invalid. In this process, the validation device implements a deep learning context module that is configured to determine context information of the message and determine whether the response is valid or invalid. For example, the response is determined to be valid if the context information indicates that the third party acknowledges the removal of the data object without authorization by the user. In another example, the response is determined to be valid if the context information indicates that the third party does not acknowledge the removal of the data object without authorization by the user.

If it is determined that the response is valid, the validation device recommends one or more actions to be performed with respect to the missing data object. For example, if it is determined that the response indicates that the third party acknowledges the removal of the data object without the authorization by the user, the one or more actions may include retrieving the data object from the third party device and storing it in the memory resource. Accordingly, the disclosed system determines that the data object was removed without the authorization of the user and retrieves the data object.

Thus, the disclosed system is integrated into a practical application of improving the security of the data. In addition, the disclosed system is integrated into a practical application of improving the data retrieval process.

In the existing approaches, the process of determining whether a response is valid or invalid is performed manually. However, the process of determining the validity of the response is time-sensitive, such that if it is not determined that a response is invalid before a threshold time period, tracking and retrieving the missing data object may be exponentially difficult. For example, if the invalid response is left undetected and unprocessed (e.g., by an associate) for more than a threshold time period (e.g., more than one day, one week, three months, etc.), retrieving the missing data object may be exponentially difficult.

Furthermore, at a given time, there may be thousands of responses in a processing queue waiting to be processed. Thus, the process of determining the validity of responses cannot manually be performed within a reasonable amount of time (e.g., before the threshold time period). This may lead to the loss of the data object which may include confidential information associated with the user.

Therefore, the disclosed system provides a technological solution to these technical problems by determining the validity of responses by extracting context information from the responses and recommending appropriate actions to remedy the issue of a missing data object. Thus, the disclosed system minimizes (or prevents) data object losses.

Furthermore, the disclosed system secures the data objects from unauthorized access by bad actors who may have gained unauthorized access to the memory resource associated with the user. Furthermore, by securing the data objects from unauthorized access, computing devices that store and maintain the data objects are kept secure from unauthorized access.

In one embodiment, a system for validating a response based on context information comprises a network interface and a processor. The network interface is configured to receive a first message that indicates that a data object is removed from a memory resource via a third party device without authorization by a user. The memory resource is associated with the user. The third party device is associated with a third party. The processor is operably coupled to the network interface. The processor accesses the first message.

The processor generates a ticket in response to accessing the first message, where the ticket uniquely identifies the first message. The processor communicates, to the third party device, a second message that indicates whether the third party confirms a removal of the data object without the authorization by the user. The processor receives a response message from the third party device. The processor extracts context information from the response message, where the context information represents a meaning of the response message. The processor determines whether the response message is valid based at least in part upon the context information, where the response message is determined to be valid if the response message is actionable such that, the context information indicates that the third party acknowledges the removal of the data object without the authorization by the user, or the context information indicates that the third party does not acknowledge the removal of the data object without the authorization by the user. In response to determining that the response message is valid, the processor recommends one or more actions to be performed on the memory resource. The processor receives a confirmation that the one or more actions are performed. The processor closes the ticket.

Context Building From Text

The present disclosure contemplates systems and methods configured to build context from text, where the text may be the response received from the third party device. The disclosed system implements a deep learning context module that is configured to determine context information of the message and determine whether the response is valid or invalid.

The deep learning context module includes a plurality of neural network layers including an input layer, one or more hidden layers, and an output layer. The disclosed system (via the deep learning context module) determines the context information of each portion of the text. Each portion of the text may be a sentence from the text.

The disclosed system (via the deep learning context module) compares the context information determined from each portion in the first hidden layer. If retention and forget logic gates of the deep learning context module determine that a first context information of a first portion of the text is different from a second context information of a second portion of the text, the disclosed system dynamically activates a second hidden layer to determine additional information about at least one of the first and second portion, and thus at least one of the first and second context information.

Thus, if the retention and forget logic gates determine that the text has more than one context information (i.e., the context information changes between two or more portions of the text), the disclosed system may dynamically activate one or more additional hidden layers to extract additional information about at least one of the plurality of context information. In certain embodiments, the number of hidden layers may increase proportionally as the number of context information changes between the portions of the text increase.

In this manner, the depth (e.g., the number) of the hidden layers may dynamically change depending on the complexity (e.g., the number of context information) of the text. Thus, the size of the deep learning context module may change depending on the depth of the hidden layers.

Therefore, the disclosed system reduces the computational complexity for determining the context information of the text at least because the number of hidden neural network layers is dynamically adapted or changed according to the number of context information of the text. For example, a lesser number of hidden layers is used for text having less different context information in various portions. Thus, less processing and memory resources are utilized to determine the context information of the text compared to the existing machine learning modules.

Furthermore, the size of the deep learning context module is reduced as a result of dynamically reducing the number of hidden layers. Furthermore, the neuron circuits in each hidden layer are coupled to each other and thus share data, including the context information, weight values, etc.

These lead to the deep learning context module occupying less memory storage, and thus the disclosed system improves memory resource utilization of a computing device that stores the deep learning context module.

Furthermore, because the size of the deep learning context module is reduced (compared to existing machine learning modules), the deep learning context module can be implemented on a computing device having limited memory storage, such as a portable mobile device or a smart watch.

In one embodiment, a system for context building from text comprises a memory and a processor. The memory is configured to store text comprising a plurality of sentences. The processor is operably coupled to the memory. The processor splits the text into a plurality of portions, where the plurality of portions comprises a first portion and a second portion. The processor extracts a first context information from the first portion, where the first context information comprises a first meaning of the first portion. The processor extracts a second context information from the second portion, where the second context information comprises a second meaning of the second portion, where extracting the first context information and the second context information is in response to feeding the plurality of portions to a first plurality of neuron circuits. Each of the plurality of neuron circuits comprises a circuitry configured to determine context information from each of the plurality of portions. The processor compares the first context information with the second context information. The processor determines whether the first context information is different from the second context information. In response to determining that the first context information is different from the second context information, the processor performs the operations below. The processor dynamically activates at least one of a second plurality of neuron circuits, where the second plurality of neuron circuits is different from the first plurality of neuron circuits. The processor determines, via the at least one of the second plurality of neuron circuits, an additional information from at least one of the first portion and the second portion, where the additional information comprises more detail about the at least one of the first context information and the second context information. The processor updates the at least one of the first context information and the second context information to include the additional information. The processor generates a first output that comprises the updated first context information and the updated second context information, where the first output indicates that the updated first context information is different from the updated second context information.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

As described above, previous technologies fail to provide efficient and reliable solutions to determine context information from text and determine the validity of the text based on the context information. Embodiments of the present disclosure and its advantages may be understood by referring to FIGS. 1 through 5. FIGS. 1 through 5 are used to describe a system and method to determine context information from text and determine the validity of the text based on the context information.

System Overview

Figure 1:
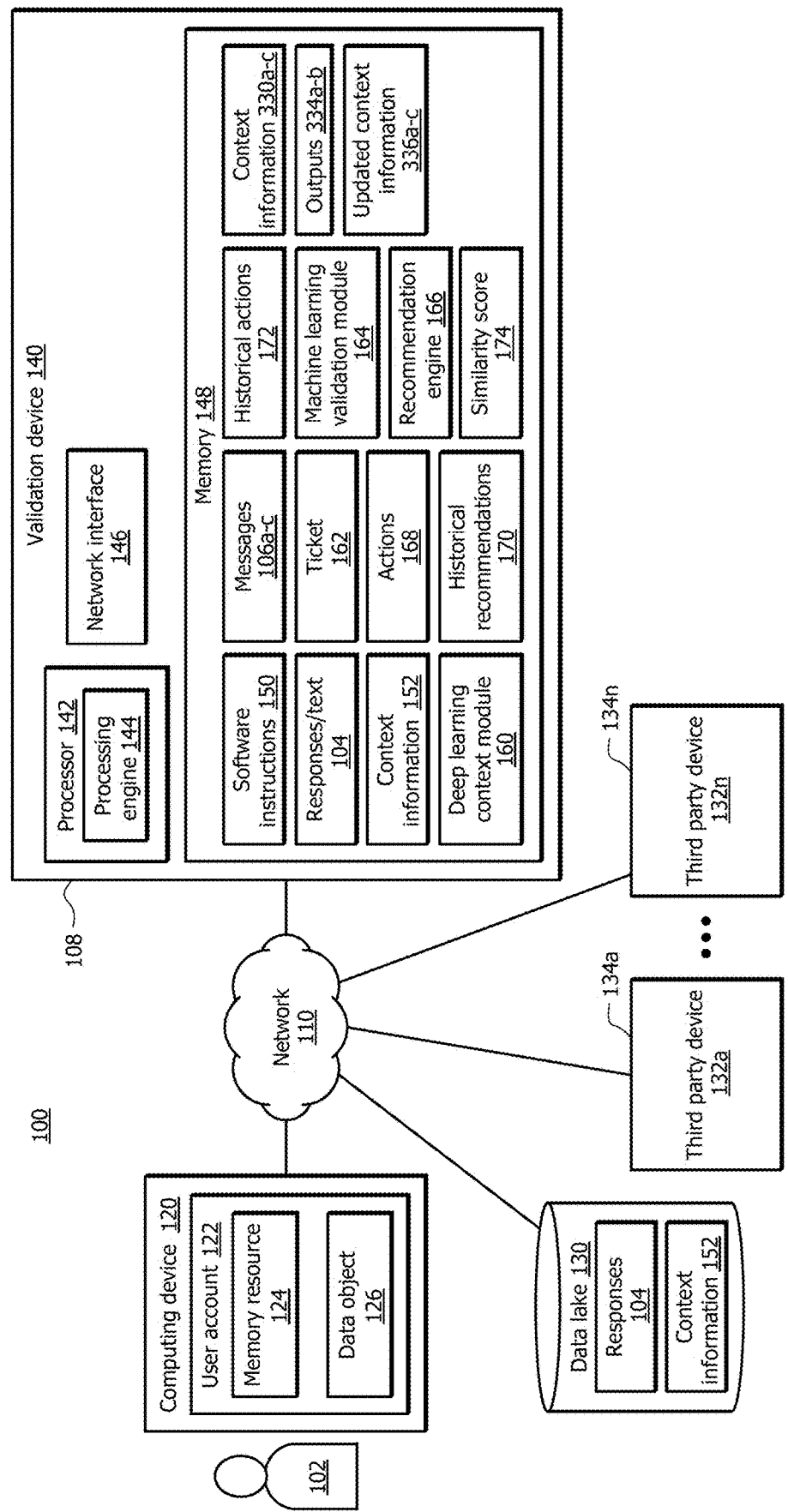
FIG. 1 illustrates an embodiment of a system configured to determine context information of a response and validate the response based on the context information.

FIG. 1 illustrates an embodiment of a system 100 that is configured to determine whether a response 104 is valid or invalid based on context information 152. In one embodiment, the system 100 comprises a validation device 140 communicatively coupled with a computing device 120, a data lake 130, and one or more third party devices 132 via a network 110. Network 110 enables the communication between components of the system 100. Data lake 130 stores information that can be used by the validation device 140. The validation device 140 comprises processor 142 in signal communication with a memory 148. Memory 148 stores software instructions 150 that when executed by the processor 142, cause the processor 142 to perform one or more operations of the validation device 140 described herein. In other embodiments, system 100 may not have all of the components listed and/or may have other elements instead of, or in addition to, those listed above.

In an example scenario, the user 102 may send a first message 106a to the validation device 140 indicating that a data object 126 has been removed from a memory resource 124 associated with the user 102 via a third party device 132 (e.g., the first third party device 132a) without the authorization by the user 102. The message 106a may include a request to retrieve the data object 126 from the third party 134a and/or the third party device 132a. The validation device 140 receives the message 106a. The validation device 140 communicates a second message 106b to the third party device 132a, where the second message 106b indicates whether the third party 134a (associated with the third party device 132a) confirms a removal of the data object 126 from the memory resource 124 without the authorization by the user 102. The validation device 140 receives a response message 104 from the third party device 132a.

In some cases, the response message 104 may be invalid. An invalid response message 104 may be vague, incomplete, irrelevant and/or not actionable. In cases where the response message 104 is invalid, the validation device 140 may not be able to recommend an appropriate action 168 to be performed, such as retrieving the data object 126 from the third party device 132a and storing it in the memory resource 124.

One potential approach is that an associate manually determines whether the response message 104 is valid or invalid. However, the process of determining the validity of the response message 104 is time-sensitive, such that if it is not determined that a response message 104 is invalid before a threshold time period, the data object 126 may be exponentially difficult and/or no longer retrieved according to certain guidelines. For example, if the invalid response message 104 is left undetected and unprocessed (e.g., by an associate) for more than a threshold time period (e.g., more than one day, one week, three months, etc.), retrieving the missing data object 126 may be exponentially difficult and/or may no longer be retrieved according to certain guidelines.

Furthermore, at a given time, there may be thousands of response messages 104 in a processing queue waiting to be processed. Thus, the process of determining the validity of response messages 104 cannot manually be performed within a reasonable amount of time (e.g., before the threshold time period). This may lead to the loss of the data object 126 which is associated with user data/information which may be personal and confidential for the user.

Thus, the system 100 is configured to determine the validity of the response message 104, and if it is determined that the response message 104 is valid, recommend an appropriate action 168 to be performed. This process is described in greater detail below in conjunction with FIG. 2.

System Components

Network

Network 110 may be any suitable type of wireless and/or wired network, including, but not limited to, all or a portion of an Internet, an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a packet data network (e.g., the Internet), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, a Zigbee network, a Z-wave network, a WiFi network, and/or any other suitable network. The network 110 may be configured to support any suitable type of communication protocol.

Computing Device

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry configured to perform any of the functions or actions of the computing device 120 described herein. For example, a software application designed using software code may be stored in the memory and executed by the processor to perform the functions of the computing device 120. The computing device 120 is configured to communicate with other devices via the network 110, such as the validation device 140.

The computing device 120 may have a display screen from which the user 102 can access data. For example, the user 102 may access and view a user account 122 associated with the user 102 from the display screen of the computing device 120. The user 102 may access and log into the user account 122, e.g., at a website where the user has registered the user account 122. The user account 122 may be associated with an organization 108 that provides services and/or products to its users (e.g., user 102). The user 102 may access a memory resource 124 associated with the user account 122. The memory resource 124 may be a memory block or a memory portion stored in a device (e.g., a database or a server (not explicitly shown)) associated with the organization 108. The user 102 may be able to access the memory resource 124 and view the data stored in the memory resource 124 by accessing the user account 122.

The memory resource 124 may be associated with (and/or store data objects 126). Each data object 126 may represent data/information associated with the user 10, such as a service or a product provided by the organization to the user 102. The user 102 may store a data object 126 into the memory resource 124, remove a data object 126 from the memory resource 124, and revise (e.g., update) a data object 126.

Data Lake

Data lake 130 generally comprises any storage architecture. Examples of the data lake 130 include, but are not limited to, a network-attached storage cloud, a storage area network, a storage assembly directly (or indirectly) coupled to one or more components of the system 100. The data lake 130 stores a plurality of responses 104 and a plurality of context information 152.

The plurality of responses 104 may be received from the third party devices 132 (e.g., third party devices 132*a* to 132*n*). The validation device 140 may receive the plurality of responses 104 and store them in the data lake 130. Each of the plurality of context information 152 may be associated with a respective response 104. The validation device 140 may extract the context information 152 from each response 104, link the extracted context information 152 to its respective response 104, and store the extracted context information 152 in the data lake 130.

Third Party Device

Third party devices 132*a* to 132*n* may include any number of third party devices 132. Each of the third party devices 132*a* to 132*n* is associated with a respective third party 134. For example, the third party device 132*a* is associated with the third party 134*a*, the third part device 132*n* is associated with the third party 134*n*. A third party 134 may be an individual or an organization (other than the organization 108).

Each of the third party devices 132*a* to 132*n* may be an instance of a third party device 132. The third party device 132 is generally any device that is configured to process data and interact with users. Examples of the third party device 132 include but are not limited to, a personal computer, a desktop computer, a workstation, a server, a laptop, a tablet computer, etc. The third party device 132 may include a user interface, such as a display, a microphone, keypad, or other appropriate terminal equipment usable by users. The third party device 132 may include a hardware processor, memory, and/or circuitry configured to perform any of the functions or actions of the third party device 132 described herein. For example, a software application designed using software code may be stored in the memory and executed by the processor to perform the functions of the third party device 132. The third party device 132 is configured to communicate with other devices via the network 110, such as the validation device 140.

In certain embodiments, the system 100 may utilize the third party devices 132 to channelize communications with various organizations. For example, a different communication channel may be used to communicate with various organizations. In certain embodiments, the system 100 may utilize the third party devices 132 to track responses 104 received from each organization based on timestamps, and push auto-reminders (e.g., follow up messages 106*b*) to the organizations.

Validation Device

Validation device 140 is generally a device that is configured to process data and communicate with computing devices (e.g., computing devices 120), third party devices 132, databases, data lakes 130, systems, etc., via the network 110. The validation device 140 may be associated with the organization 108. The validation device 140 is generally configured to oversee the operations of the processing engine 144 as described further below in conjunction with the operational flow 200 of system 100 described in FIG. 2, an example configuration of the deep learning context module 160 described in FIG. 3, method 400 described in FIG. 4, and method 500 described in FIG. 5.

Processor 142 comprises one or more processors operably coupled to the memory 148. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors 142 may be implemented in cloud devices, servers, virtual machines, and the like. The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 150) to implement the processing engine 144. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-5. For example, the processor 142 may be configured to perform one or more operations of method 400 as described in FIG. 4 and one or more operations of method 500 as described in FIG. 5.

Network interface 146 is configured to enable wired and/or wireless communications. The network interface 146 may be configured to communicate data between the validation device 140 and other devices, systems, or domains. For example, the network interface 146 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 142 may be configured to send and receive data using the network interface 146. The network interface 146 may be configured to use any suitable type of communication protocol.

The memory 148 may be volatile or non-volatile and may comprise read-only memory (ROM), random-access memory (RAM), ternary content-addressable memory (TCAM), dynamic random-access memory (DRAM), and static random-access memory (SRAM). The memory 148 may include one or more of a local database, cloud database, network-attached storage (NAS), etc. The memory 148 comprises one or more disks, tape drives, or solid-state drives, and may be used as an over-flow data storage device, to store programs when such programs are selected for execution, and to store instructions and data that are read during program execution. The memory 148 may store any of the information described in FIGS. 1-5 along with any other data, instructions, logic, rules, or code operable to implement the function(s) described herein when executed by processor 142. For example, the memory 148 may store software instructions 150, responses/text 104, context information 152, deep learning context module 160, messages 106*a-c*, ticket 162, actions 168, historical recommendations 170, historical actions 172, machine learning validation module 164, recommendation engine 166, similarity score 174, context information 330*a-c*, outputs 334*a-b*, updated context information 336*a-b*, and/or any other data or instructions. The software instructions 150 may comprise any suitable set of instructions, logic, rules, or code operable to execute the processor 142 and perform the functions described herein, such as some or all of those described in FIGS. 1-5.

Processing Engine

Processing engine 144 may be implemented by the processor 142 executing the software instructions 150, and is generally configured to perform one or more operations described herein. For example, the processing engine 144 may be configured to determine context information 152 from a response 104. For example, the context information 152 of a response 104 may represent a meaning and contextual data of the response message 104. In some examples, the context information 152 may include a summary of the response 104, a meaning, and/or any contextual data representing the response message 104.

In certain embodiments, the processing engine 144 may be implemented by a deep learning context module 160. For example, the deep learning context module 160 may be implemented by a plurality of neural network layers, and the like. The deep learning context module 160 may be configured to extract context information 152 from a response 104.

In certain embodiments, the deep learning context module 160 may include an input layer (connected to) one or more hidden layers (connected to) an output layer. In certain embodiments, in each hidden layer, the neuron circuits (e.g., neuron logic gates) are connected to each other.

Figure 3:
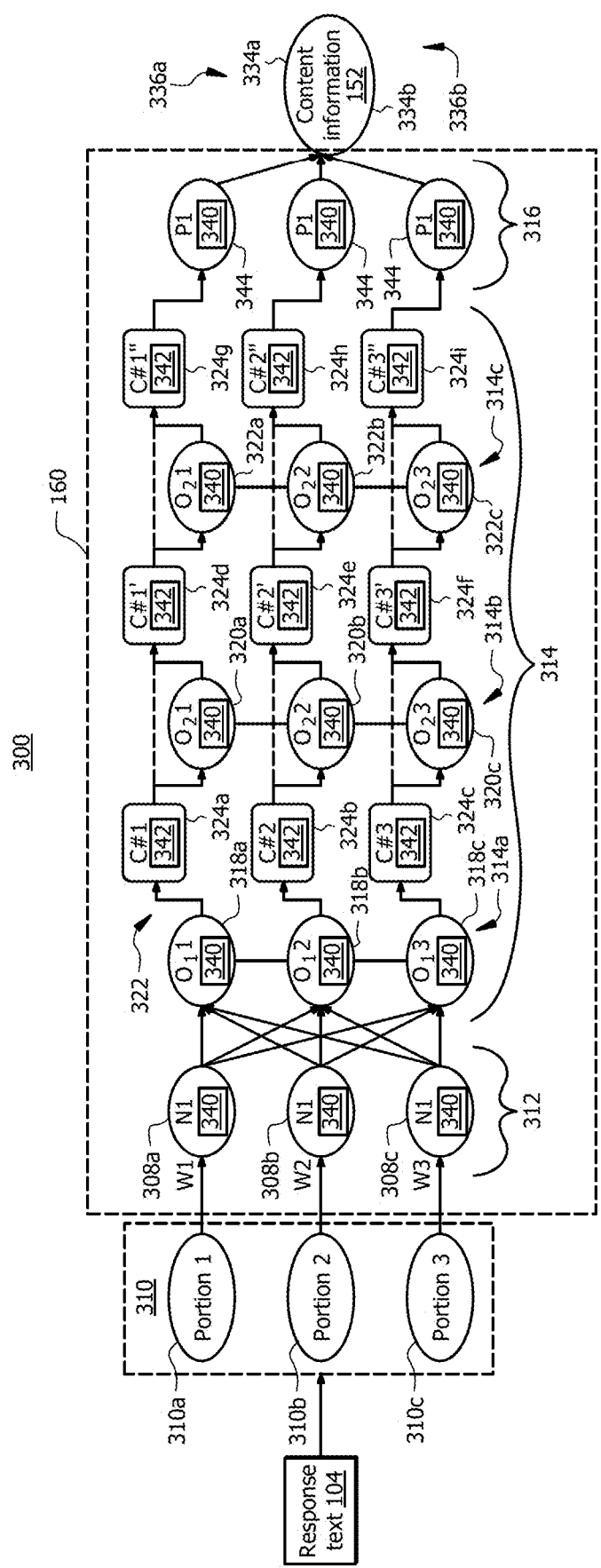
FIG. 3 illustrates an example operational flow of context building from text using the system of FIG. 1.

An example embodiment of the deep learning context module 160 is illustrated in FIG. 3. Referring to FIG. 3, the neuron circuits 318*a-c*, 320*a-c*, and 322*a-c* in each hidden layer 314*a-c*, respectively, share data with each other, including weight values, bias values, context information 330*a-c* which can be utilized multiple times to extract contextual data from an input of the deep learning context module 160 (e.g., a response message 104). The context information 330*a-c* may be intermediate context information as supposed to the final context information 152 of the text 104.

For example, the neuron circuits 318*a-c* are operably coupled to each other and share data with each other, including weight values, bias values, context information 330*a-c*. In another example, the neuron circuits 320*a-c* are operably coupled to each other and share data with each other, including weight values, bias values, and optionally context information (if they are activated). In another e example, the neuron circuits 322*a-c* are operably coupled to each other and share data with each other, including weight values, bias values, and optionally context information (if they are activated).

Referring back to FIG. 1, the deep learning context module 160 may be implemented by a supervised machine learning, semi-supervised machine learning, and/or unsupervised machine learning algorithm.

In response to determining the context information 152 from a response message 104, the processing engine 144 determines whether the response message 104 is valid or invalid based on the context information of the response message 104. The operations of the processing engine 144 are described in greater detail in FIGS. 2 and 3.

Operational Flow

Figure 2:
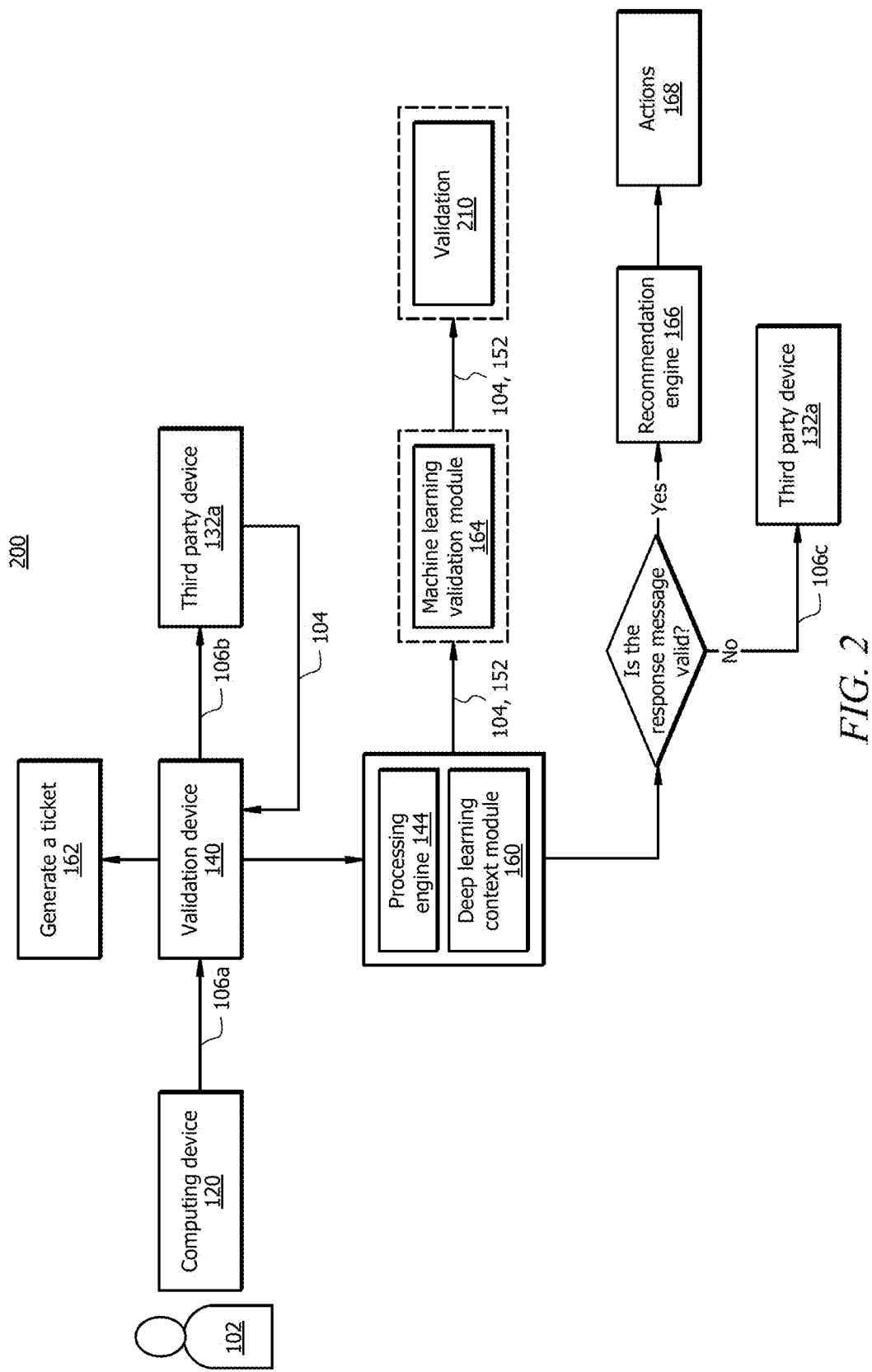
FIG. 2 illustrates an example operational flow of the system of FIG. 1.

FIG. 2 illustrates an embodiment of an operational flow 200 of system 100 of FIG. 1. In an example scenario, assume that the user 102 accesses the user account 122 and notices that a data object 126 is removed (e.g., data objects 126 are altered).

Receiving a Message Indicating that a Data Object is Removed from a Memory Resource The operational flow 200 begins when the user 102 sends a message 106*a* to the validation device 140. The message 106*a* may indicate that the data object 126 is removed from the memory resource 124 associated with the user 102 via a third party device 132 (e.g., the first third party device 132*a*) without the authorization of the user 102.

The validation device 140 may receive the message 106*a* via the network interface 146 and network 110 of FIG. 1. For example, the user 102 may determine that the data object 126 has been removed from the memory resource 124 via the third party device 132 (e.g., the first third party device 132*a*) based on historical data communications between the first third party device 132*a* and the memory resource 124, and indicate that in the message 106*a*.

In another example, the processing engine 144 may determine that the data object 126 is removed from the memory resource 124 by accessing the historical data communications between the first third party device 132*a* and the memory resource 124 and determining that the third party 134*a* has removed the data object 126 from the memory resource 124 via the first third party device 132*a*.

The processing engine 144 accesses the message 106*a*. In response, the processing engine 144 generates a ticket 162. In certain embodiments, generating the ticket 162 may be in response to determining that the message 106*a* is received less than a threshold number of days before the removal of the data object 126 (e.g., fifty days, fifty-seven days, etc. before the removal of the data object 126). The ticket 162 may represent an identifier for the message 106*a*.

The processing engine 144 communicates a second message 106*b* to the third party device 132*a*, where the second message 106*b* indicates whether the third party 134*a* confirms the removal of the data object 126 from the memory resource 124 without the authorization by the user 102.

Determining Whether a Response is Valid

The processing engine 144 receives a response message 104 from the third party device 132*a*. The processing engine 144 extracts context information 152 from the response message 104. In this process, the processing engine 144 feeds the response message 104 to the deep learning context module 160. The deep learning context module 160 is configured to extract the context information 152 from the response message 104. An example embodiment of the deep learning context module 160 is described in greater detail in FIG. 3.

The output of the deep learning context module 160 may include the context information 152 of its input, i.e., the response 104. The processing engine 144 determines whether the response message 104 is valid based on the context information 152.

In certain embodiments, the processing engine 144 may determine that the response message 104 is valid if the response message 104 is actionable—meaning that the response message 104 can proceed further to the next stage.

For example, the processing engine 144 may determine that the response message 104 is valid if the context information 152 indicates that the third party 134a acknowledges the removal of the data object 126 from the memory resource 124 without the authorization by the user 102.

In the same or another example, the processing engine 144 may determine that the response message 104 is valid if the context information 152 indicates that the third party 134a does not acknowledge the removal of the data object 126 from the memory resource 124 without the authorization by the user 102.

For example, the processing engine 144 (e.g., via the deep learning context module 160) may parse the response 104 and identify particular keywords that indicate the meaning of the response message 104.

For example, the deep learning context module 160 may be pre-trained to identify particular keywords that indicate valid responses, such as the third party 134a acknowledges the removal of the data object 126 from the memory resource 124 without the authorization by the user 102 and the third party 134a does not acknowledge the removal of the data object 126 from the memory resource 124 without the authorization by the user 102. Based on the found particular keywords, the deep learning context module 160 determines which case of a valid response 104 (described above) the response 104 is.

Thus, in certain embodiments, the processing engine 144 may determine that the response message 104 is valid if the processing engine 144 can proceed further and recommend an appropriate action to be performed to advance the ticket 162 to the next stage.

In certain embodiments, the processing engine 144 may determine that the response message 104 is invalid if the response message 104 is not actionable—meaning that the response message 104 cannot proceed further to the next stage.

For example, the processing engine 144 may determine that the response message 104 is invalid if it is determined that (based on the context information 152) that the response message 104 is an automatically-generated response, only comprises an acknowledgment message (i.e., only acknowledging a receipt of the message 106b), is associated with another data object, is associated with another memory resource, and/or is associated with another user.

In the same or another example, the response message 104 is determined to be invalid if there is not enough information (e.g., context) in the response message 104 to move the operational flow 200 forward, the response message 104 is incomplete, e.g., does not address the message 106b, etc.

Similar to that described above, the deep learning context module 160 may also be pre-trained with particular keywords that indicate invalid responses. Based on the found particular keywords, the deep learning context module 160 determines which case of an invalid response 104 (described above) the response 104 is.

In certain embodiments, the processing engine 144 may optionally (indicated by dash lines) feed the response message 104 and the context information 152 to a machine learning validation module 164 to validate the context information 152.

In certain embodiments, the machine learning validation module 164 may be a pre-trained model that is trained with a particular training dataset that comprises lexicon of a field of the language and technology that the organization 108 uses, e.g., a technological field of web development, a particular product industry, a particular service industry, etc.

The machine learning validation module 164 may be pre-trained to understand particular words (e.g., technical words related to the lexicon of a field of the technology that the organization 108 uses) used in response 104. The machine learning validation module 164 may confirm, update, or override the determination of the context information 152 and/or validity of the response 104.

In certain embodiments, at validation stage 210, the processing engine 144 may optionally (indicated by dash lines) forward the response message 104 and the context information 152 to an associate for manually validating the context information 152. At the validation stage 210, the associate may confirm, update, or override the determination of the context information 152 and/or validity of the response 104.

In certain embodiments, the processing engine 144 may use the results from the determination of the validity of response 104 and the context information 152 to refine the deep learning context module 160 to increase the accuracy of the determinization of the context information 152 and validity of the response 104.

In certain embodiments, the deep learning context module 160 and machine learning validation module 164 may be implemented in different modules as described above.

In certain embodiments, the deep learning context module 160 and machine learning validation module 164 may be implemented in a single module, e.g., the deep learning context module 160.

Recommending an Action to be Performed with Respect to the Memory Resource

In certain embodiments, if the processing engine 144 determines that the third party device 132a has not sent a response message 104 before a threshold time period from sending the message 106b (e.g., before three days, five days, ten days, or any other suitable time period), the processing engine 144 may send another message 106b to the third party device 132b.

In certain embodiments, the processing engine 144 may send one or more other (e.g., follow up) message 106b to the third party device 132a, for example, a response message 104 is received from the third party device 132a.

In certain embodiments, upon receiving the message 104, the processing engine 144 may determine whether the response 104 is valid or invalid, similar to that described above.

A Case where the Response is Valid

In certain embodiments, if the processing engine 144 determines that the response 104 is valid, the processing engine 144 implements a recommendation engine 166 to recommend one or more actions 168. The recommendation engine 166 may be implemented by the processing engine 144 (and/or the processor 142) executing the software instructions 150. The recommendation engine 166 is generally configured to recommend one or more actions 168 based on whether the response message 104 is valid or invalid.

In certain embodiments, in response to the context information 152 indicating that the third party 134*a* acknowledging (or acknowledged) the removal of the data object 126 from the memory resource 124 without the authorization by the user 102, the one or more actions 168 may include retrieving the data object 126 from the third party device 132*a* and storing the data object 126 in the memory resource 124.

In certain embodiments, in response to the context information 152 indicating that the third party 134*a* not acknowledging (or did not acknowledge) the removal of the data object 126 from the memory resource 124 without the authorization by the user 102, the one or more actions 168 may include indicating to the user 102 that the data object 126 was not removed from the memory resource 124 without the authentication by the user 102, and that the request to retrieve the data object 126 from the third party 134*a* (indicated in the message 106*a*) is denied.

In certain embodiments, an associate may confirm, update, or override any of the one or more actions 168.

In certain embodiments, the recommendation engine 166 may determine the one or more actions 168 for each case of a valid response message 104 based on historical recommendations 170 and historical actions 172 that were approved and carried out. For example, if the current response message 104 and context information 152 have a similarity score 174 more than a threshold percentage (e.g., more than 80%, 85%, etc.) with a particular historical response message and its respective context information, the recommendation engine 166 may use a historical recommendation 170 and historical actions 172 associated with (e.g., that were carried out for) the historical response message and its respective context information for the current response message 104 and context information 152.

The recommendation engine 166 may determine the similarity score 174 between the current response message 104 and its context information 152, and the historical response message and its context information, respectively, by implementing a natural language processing algorithm.

For example, the recommendation engine 166 may feed the current response message 104 and its context information 152 to the natural language processing algorithm to extract features from them. The extracted features may be represented by vectors comprising numerical values. The extracted features may represent the meaning and any other linguistic contextual data of the current response message 104 and its context information 152. The recommendation engine 166 may perform a similar operation for the historical response message and its context information.

The recommendation engine 166 may compare the features of the current response message 104 and its context information 152 with counterpart features of the historical response message and its context information, respectively.

The recommendation engine 166 determines the similarity score 174 between the current response message 104 and its context information 152, and the historical response message and its context information based on the comparison between the features of the current response message 104 and its context information 152 with counterpart features of the historical response message and its context information, respectively.

The recommendation engine 166 determines a percentage of the features of the current response message 104 and its context information 152 that correspond to counterpart features of the historical response message and its context information, respectively. The similarity score 174 may correspond to the percentage of the features of the current response message 104 and its context information 152 that correspond to counterpart features of the historical response message and its context information, respectively. For example, if it is determined that 90% of the features of the current response message 104 and its context information 152 correspond to counterpart features of the historical response message and its context information, the recommendation engine 166 determines that the similarity score 174 between the current response message 104 and its context information 152 and the historical response message and its context information is 90%.

In certain embodiments, the recommendation engine 166 may determine the similarity score 174 based on the Euclidian distance between a first vector representing the features of the current response message 104 and its context information 152 and a second vector representing the features of the historical response message and its context information. The Euclidian distance is inversely proportional to the similarity score 174. For example, if it is determined that the Euclidian distance between the first vector and the second vector is 1%, the recommendation engine 166 may determine that the similarity score 174 is 99%.

A Case where the Response is Invalid

In certain embodiments, if the processing engine 144 determines that the response message 104 is invalid, the processing engine 144 may communicate one or more messages 106*c* (follow up messages) to the third party device 132*a*, until a second response message 106*b* is received from the third party device 132*a* and is determined to be valid. Each message 106*c* may be similar to the message 106*b*.

Example Deep Learning Context Module

FIG. 3 illustrates an example embodiment of a deep learning context module 160 and its operation. As described in FIG. 2, the processing engine 144 feeds the response message 104 to the deep learning context module 160 to extract and determine the context information 152 from the response message 104 and determine whether the response message 104 is valid or invalid. To this end, the processing engine 144 via the deep learning context module 160 may perform the operational flow 300 of the deep learning context module 160.

In certain embodiments, the deep learning context module 160 may be configured to reuse neuron logic gates 308, 318, 320, 322, 344—meaning that each neuron logic gate takes an input (e.g., one portion 310 of the text 104), processes it using a nonlinear activation function to develop interpretation and produces an output (i.e., the context information 330). The context information 330 may be saved in a context cell 324. Subsequently, the same neuron logic gate can be used again to take a new portion 310 of the text 104 as input, develop a context information 330 and store the context information 330 in the context cell 324. In this manner, the system 100 is configured to build long context for interpretation and summarization of large corpus of text 104 or speech (after transcription of the speech and converting it to text using a speech-to-text convertor). In this way, the same neuron logic gates can be used multiple times to develop and store long context without increasing the size of the neural network architecture of the deep learning context module 160.

In the existing neural network architectures, neurons of one hidden layer do not share the weights information with other neurons on the same hidden layer due to which context building requires more neurons in the neural network. In certain embodiments, in the deep learning context module 160, the weights information of one neuron logic gate 318, 320, 322 can be shared with other neuron logic gates 318, 320, 322 of the same hidden layer 314 to reduce the requirement of more neuron logic gates 318, 320, 322. This obviates the need for a large neural network architecture, and improves the speed of processing operation of the deep learning context module 160, e.g., due to the reduction in computational complexity of determining the context information, requiring a fewer processing and memory resources to determine the context information.

In certain embodiments, the processing engine 144 and/or the deep learning context module 160 may split the response message 104 into a plurality of portions 310.

In this process, the deep learning context module 160 may perform word tokenization, sentence tokenization, word segmentation, sentence segmentation, word-tagging, sentence tagging, word sequences, sentiment analysis, and/or any other linguistic pattern analysis. For example, a portion 310 may be one sentence of the response message 104. In another example, a portion 310 may be a fragment (e.g., one or more words) in one or more sentences of the response message 104.

In the illustrated embodiments, three portions 310a to 310c are shown solely for illustration purposes. However, it is understood that the response message 104 may be split into any suitable number of portions 310.

The deep learning context module 160 includes an input neural network layer 312 (also referred to herein as an input layer 312), a plurality of neural network hidden layers 314 (also referred to herein as hidden layers 314), and an output neural network layer 316 (also referred to herein as an output layer 316). Each neuron circuit 308a-c in the input layer 312 is noted as N1. Each neuron circuit 318, 320, 322 in the hidden layers 314 is noted as $O_{i,j}$, where i represents the column number of the represents, and j represents the row number of the neuron circuit. Each neuron circuit 344 in the output layer 316 is noted as P1.

Each of the input layer 312, hidden layers 314, and output layer 316 includes a plurality of neuron circuits 308, 318, 320, 322, 344 respectively. In this disclosure, a neuron circuit 308, 318, 320, 322, 344 may be interchangeably referred to as a neuron logic gate 308, 318, 320, 322, 344. Each neuron circuit 308, 318, 320, 322, 344 may be implemented by the processor 142 executing the software instructions 150, and is configured to perform the functions of the neuron circuit 308, 318, 320, 322, 344 described herein. Each neuron circuit 308, 318, 320, 322, 344 may include (and/or represent) a circuitry 340 that may be implemented by the processor 142 executing the software instructions 150, and comprise a processor, a processing resource, a memory resource, and/or implemented by software algorithm code 150 configured to perform the functions of each neuron circuit 308, 318, 320, 322, 344.

Each neuron circuit 308, 318, 320, 322, 344 is configured to perform a mathematical function, such as computing a weighted average of its inputs, and this sum is passed through a nonlinear function, such as an activation function, sigmoid, etc. For example, a neuron circuit 318a takes an input (e.g., N1) and multiplies it with its respective weight W1, and applies a nonlinear function on it.

Each input to a neuron circuit 308, 318, 320, 322, 344 is assigned a different weight (not explicitly shown). As can be seen in FIG. 3, each neuron circuit 308a-c is assigned a different weight (noted as W1, W2, W3). Each neuron circuit 308, 318, 320, 322, 344 is assigned a bias value (not explicitly shown). Each neuron circuit 308, 318, 320, 322, 344 is configured to determine context information from its input.

The input layer 312 is fully connected to the first hidden layer 314a. The input layer 312 may include a plurality of neuron circuits 308a-c. Each neuron circuit 308a-c takes a portion 310 of the response 104, and extracts its features. The input layer 312 passes the features of the portions 310 to the first hidden layer 314a.

In the input layer 312, the deep learning context module 160 may extract features of each portion 310 of the response 104. The features of each portion 310 may be represented by a vector comprising numerical values. For example, the features of a portion 310 may represent words, meaning, and contextual data collectively referred to herein as context information of the portion 310. Other neuron circuits 318, 320, 322 may perform a similar operation.

In the training stage, the deep learning context module 160 may assign bias and weight values W1-W3 to the neuron circuits 308a-c (and other bias and weight values to other neuron circuits) to increase the accuracy of the determination of the context information 152 of the response 104. This may be referred to as a forward feed operation.

For example, in the training stage, the may be given a training dataset comprising a set of training responses 104 each labeled with context information 152. The deep learning context module 160 extract features from each training response and learns the association between each training response 104 and its respective context information 152.

In the testing stage, the deep learning context module 160 is given a testing response 104 without context information 152 and is asked to predict the context information 152 of the testing response 104. The deep learning context module 160 uses the learned associations between the training responses 104 and their respective context information 152 to predict the context information 152 of the testing response 104.

In the refining stage, the deep learning context module 160 may perform back propagation and update the bias and weight values of one or more neuron circuits 308, 318, 320, 322, 344 to increase the accuracy of the determination of the context information 152 of the testing response 104.

The existing natural language processing modules are bulky and have complex neural network layer connections. Thus, the existing natural language processing modules consume a lot of processing power and have a large computational complexity, i.e. have to perform a lot of computationally-intensive calculations to determine or predict the context information of the text.

In the deep learning context module 160, the neuron circuits 318, 320, 322 in each hidden layer 314a-c are connected to one another, respectively.

This leads to the neuron circuits 318, 320, 322 in each hidden layer 314a-c to be able to share weight information (e.g., weights assigned to neuron circuits in each hidden layer 314) with each other, respectively. This may lead to building long context for a long text (e.g., a response 104 having more than a threshold number of words, such as more than a hundred, two-hundreds, five-hundreds, etc.) across intra-connected hidden layers 314.

In the illustrated embodiment, with respect to the first hidden layer 314a, the neuron circuit 318a is connected to neuron circuit 318b, and the neuron circuit 318b is connected to the neuron circuit 318c. In the second hidden layer 314b, the neuron circuit 320a is connected to neuron circuit 320b, and the neuron circuit 320b is connected to the neuron circuit 320c. In the third hidden layer 314c, the neuron circuit 322a is connected to neuron circuit 322b, and the neuron circuit 322b is connected to the neuron circuit 322c.

In this manner, the weight information and context information determined from each portion 310 is shared among the neuron circuits 318, 320, 322 of each hidden layer 314, respectively.

In other words, the intelligence determined by each neuron circuit 318, 320, 322 in each hidden layer 314a-c is shared among the neuron circuits 318, 320, 322 of each hidden layer 314a-c respectively.

As such, the context information determined from different portions 310 may be compared with one another at a given hidden layer 314. This may lead to a reduction in the size of the deep learning context module 160 compared to the existing natural language processing modules that suffer from bulky and complex neural networks.

In other words, the deep learning context module 160 may be able to perform a similar operation compared to the existing natural language processing modules with less number of neural network layers (e.g., less number of hidden layers 314) and fewer connections among the hidden layers 314. Thus, the deep learning context module 160 may have a smaller size (e.g., in kilobyte) compared to the existing natural language processing solutions. Therefore, the deep learning context module 160 can be installed on a portable device that has limited memory storage, such as a mobile phone or a smartphone.

The hidden layers 314 may include a plurality of context cells 324 (e.g., context cells 324a to 324i).

The context cells 324a-i are an instance of a context cell 324. Each context cell 324 may be implemented by the processor 142 executing the software instructions 150, and is configured to perform the functions of the context cell 324 described herein. Each context cell 324 may include (and/or represent) a storage unit 342 to store context information determined by a respective neuron circuit from a portion 310 of the response 104.

In the illustrated embodiment, the context cell 324a may store at least context information 330a determined by at least neuron circuit 318a from the portion 310a of the response 104, context cell 324b may store at least context information 330b determined by at least neuron circuit 318b from the portion 310b of the response 104, context cell 324c may store at least context information 330c determined by at least neuron circuit 318c from the portion 310c of the response 104, context cell 324d may store at least context information 330a determined by at least neuron circuit 320a from the portion 310a of the response 104, context cell 324e may store at least context information 330b determined by at least neuron circuit 320b from the portion 310b of the response 104, context cell 324f may store at least context information 330c determined by at least neuron circuit 320c from the portion 310c of the response 104, context cell 324g may store at least context information 330a determined by at least neuron circuit 322a from the portion 310a of the response 104, context cell 324h may store at least context information determined by at least neuron circuit 322b from the portion 310b of the response 104, and context cell 324i may store at least context information 330c determined by at least neuron circuit 322c from the portion 310c of the response 104.

Each context cell 324 may be configured to determine and store additional information 332 related to any number and combination of the context information 330a-c.

At least a portion of hidden layer 314 may be activated (e.g., included to the neural network layers of hidden layers 314) if it is determined that first context information 330 determined from a first portion 310 of the response 104 is different from second context information 330 determined from a second portion 310 (e.g., previous portion 310 compared to the first portion 310).

Each context cell 324 may be configured to compare context information 330 of the current portion 310 of the response 104 with context information 330 of the previous (and/or subsequent) portion 310 of the response 104. For example, each context cell 324 may be implemented by software instructions 150, algorithm, or code configured to compare context information 330 of the current portion 310 of the response 104 with context information 330 of the previous (and/or subsequent) portion 310 of the response 104.

For example, assume that at least neuron circuit 318a determines a first context information 330a of the portion 310a and stores it in the context cell 324a. Also, assume that at least neuron circuit 318b determines second context information 30b of the portion 310b and stores it in the context cell 324b. also, assume that it is determined that context information 330c is the same as the context information 330b. The neuron circuits 318a and 318b are connected and share respective context information 330a-b. Thus, the context cell 324b may compare the first context information 330a of the portion 310a with the second context information 330b of the portion 310b.

If the deep learning context module 160 (e.g., via the context cell 324b and/or the context cell 324a) determines that the second context information 330b of the portion 310b is different from (e.g., changed compared to) the first context information 330a of the portion 310a, at least a portion of the second hidden layer 314b may be activated. For example, in this case, the output of the context cell 324b may be fed to the neuron circuit 320b of the second hidden layer 314b. The neuron circuit 320b may extract additional information 332 from at least one of the first context information 330a and the second context information 330b. The output of the neuron circuit 320b may be fed to the context cell 324c. The context cell 324e may store the additional information 332. The output of the context cell 324c may be fed to the context cell 324h. The output of the context cell 324a may be fed to the context cell 324a, and the output of the context cell 324c may be fed to the context cell 324f. The output of the context cell 324d may be fed to the context cell 324g, and the output of the context cell 324f may be fed to the context cell 324i. The outputs of the context cells 324g-i are combined and passed to the output layer 316. In the output layer 316, the deep learning context module 160 updates at least one of the context information 330a-c to include the additional information 332. For example, the deep learning context module 160 generates an updated context information 336a and/or updated context information 336b. The output of the deep learning context module 160 may be the context information 152 which may include the updated context information 336a and/or updated context information 336b, and the context information 330c.

In another example, in this case, the output of the context cell 324a may be fed to the neuron circuit 320a. The neuron circuit 320a may extract additional information 332 from at least one of the first context information 330a and the second context information 330b. The output of the neuron circuit 320a may be fed to the context cell 324d. The context cell 324d may store the additional information 332. The rest of the flow may be similar to the example described above.

In another example, in this case, the outputs of context cells 324a to 324c may be fed to the second hidden layer 314b. For example, the output of the context cell 324a may be fed to the neuron circuit 320a, the output of the context cell 324b may be fed to the neuron circuit 320b, and the output of the context cell 324c may be fed to the neuron circuit 320c. Each of the neuron circuits 320a-c may determine additional information 332 from at least one of the first context information 330a and the second context information 330b.

The output of the neuron circuit 320a may be fed to the context cell 324d, the output of the neuron circuit 320b may be fed to the context cell 324c, and the output of the neuron circuit 320c may be fed to the context cell 324f. Each of the context cells 324d-f may store the additional information 332. The rest of the flow may be similar to the example described above.

Otherwise, if it is determined that the second context information 330b of the portion 310b is the same as the first context information 330a of the portion 310a, the second hidden layer 314b may not be activated. In this case, the outputs of the context cells 324a to 324c may bypass the second hidden layer 314 and other hidden layers 314. Thus, the output of the context cell 324a may be fed to the context cell 324d, then to context cell 324g, and then to output layer 316, the output of the context cell 324b may be fed to the context cell 324e, then to context cell 324h, and then the output layer 316, and the output of the context cell 324c may be fed to the context cell 324f, then to context cell 324i, and then to the output layer 316. The output of the deep learning context module 160 may be the context information 152 which may indicate that context information 330a-c are the same as each other, and whether the response 104 is valid or invalid, similar to that described above.

Other context cells 324 may perform similar operations (e.g., comparing the first context information of their respective portion 310 with the second context information of the previous (and/or subsequent) portion 310, and determine whether the first context information 330a is the same as or different from the second context information 330b.

Accordingly, any number and combination of neuron circuits 318a-c, 320a-c, and 322a-c may dynamically be activated based on the context information changes between the portions 310 of the response 104. For example, if it is determined that the context information 330 of all the portions 310 of the response 104 is the same, the deep learning context module 160 may only activate one hidden layer 314 (e.g., hidden layer 314a).

In another example, if it is determined that only the first context information 330a of the first portion 310a is different from the context information 330 of the rest of the portions 310 (e.g., portions 310b and 310c) of the response 104, the deep learning context module 160 may only activate two hidden layers 314 (e.g., hidden layers 314a and 314b).

In the output layer 316, the deep learning context module 160 combines the outputs of hidden layers 314. For example, the deep learning context module 160 may combine the context information 330 determined from each portion 310 of the response 104. The context information 152 may include one or more context information 330 determined from the portions 310 of the response 104. Thus, the deep learning context module 160 is configured to determine the context information changes in the response 104.

In an example scenario, assume that the deep learning context module 160 receives a response 104 that includes three sentences. The deep learning context module 160 splits the response 104 into portions 310 where each portion 310 is one sentence of the response 104.

The deep learning context module 160 determines a first context information 330a of the first portion 310a, second context information 330b of the second portion 310b, and a third context information 330c of the third portion 310c. The deep learning context module 160 compares the first, second, and third context information 330a-c.

The deep learning context module 160 determines whether any combination of the determined first, second, and third context information 330a-c are different or the same.

For example, assume that the deep learning context module 160 determines the first context information 330a of the first portion 310a is the same as the second context information 330b of the second portion 310b, and that the third context information 330c of the third portion 310c is different from the first and second context information 330a-b. In this example, the deep learning context module 160 dynamically activates the second hidden layer 314b, and determines additional information 332 about at least one of the context information 330a-c.

The deep learning context module 160 may update the context information 330a-b and/or the context information 330c to include the additional information 332 depending on the additional information 332 being related to which one or more context information 330a-c.

The deep learning context module 160 may output the context information 152 that may include updated context information 336a-c. The context information 152 may also indicate whether the response 104 is valid or invalid, similar to that described in FIG. 2.

Example Method for Validating a Response Based on Context Information

Figure 4:
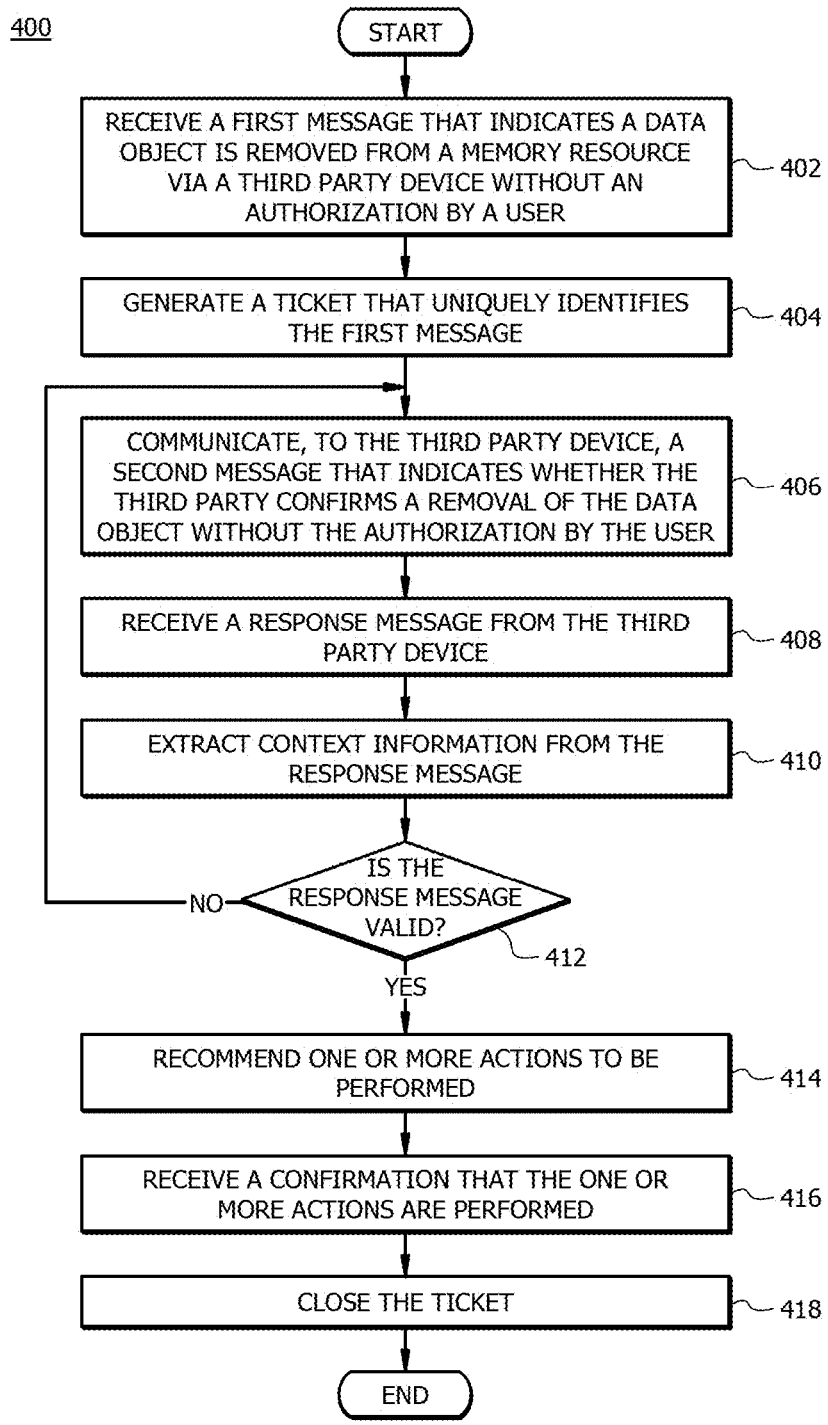
FIG. 4 illustrates an example flowchart of a method for validating a response based on context information.

FIG. 4 illustrates an example flowchart of a method 400 for validating a response based on context information. Modifications, additions, or omissions may be made to method 400. Method 400 may include more, fewer, or other operations. For example, operations may be performed in parallel or in any suitable order. While at times discussed as the system 100, validation device 140, or components of any of thereof performing operations, any suitable system or components of the system may perform one or more operations of the method 400. For example, one or more operations of method 400 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform operations 402-418.

At 402, the processing engine 144 receives a first message 106a that indicates a data object 126 is removed from a memory resource 124 via a third party device 132 (e.g., the first third party device 132a) without an authorization by the user 102. For example, the processing engine 144 receives the first message 106a from the computing device 120 via the network 110 and network interface 146.

At 404, the processing engine 144 generates a ticket 162 that uniquely identifies the first message 106a. The ticket 162 may be a randomly-generates number, symbols, letters, or any combination thereof. The processing engine 144 may implement a random-generator software code instructions to generate the ticket 162. The processing engine 144 may link the ticket 162 to the first message 106a, similar to that described in FIG. 2.

At 406, the processing engine 144 communicates, to the third party device 132a, a second message 106b that indicates whether the third party 134a confirms removal of the data object 126 without the authorization by the user 102.

At 408, the processing engine 144 receives a response message 104 from the third party device 132a.

At 410, the processing engine 144 extracts context information 152 from the response message 104. The context information 152 may include a summary of the response 104, a meaning, and/or any contextual data representing the response message 104. In this process, the processing engine 144 may feed the response message 104 to the deep learning context module 160. The processing engine 144 and the deep learning context module 160 may perform as described in FIG. 2 and the operational flow 300 described in FIG. 3 to extract the context information 152 from the response message 104.

At 412, the processing engine 144 determines whether the response message 104 is valid. The processing engine 144 (e.g., via the deep learning context module 160) may determine that the response message 104 is valid if it is determined that the response message 104 is actionable, similar to that described in FIGS. 2 and 3. If the processing engine 144 determines that the response message 104 is valid, method 400 proceeds to 414. Otherwise, method 400 returns to 406.

At 414, the processing engine 144 recommends one or more actions 168 to be performed on the memory resource 124. Examples of the one or more actions 168 for different scenarios are described in FIGS. 2 and 3. The processing engine 144 recommends the one or more actions 168 to an associate.

At 416, the processing engine 144 receives a confirmation that the one or more actions 168 are performed. For example, the processing engine 144 receives the confirmation from an associate.

At 418, the processing engine 144 closes (e.g., archives or concludes) the ticket 162.

Example Method for Context Building from Text

Figure 5:
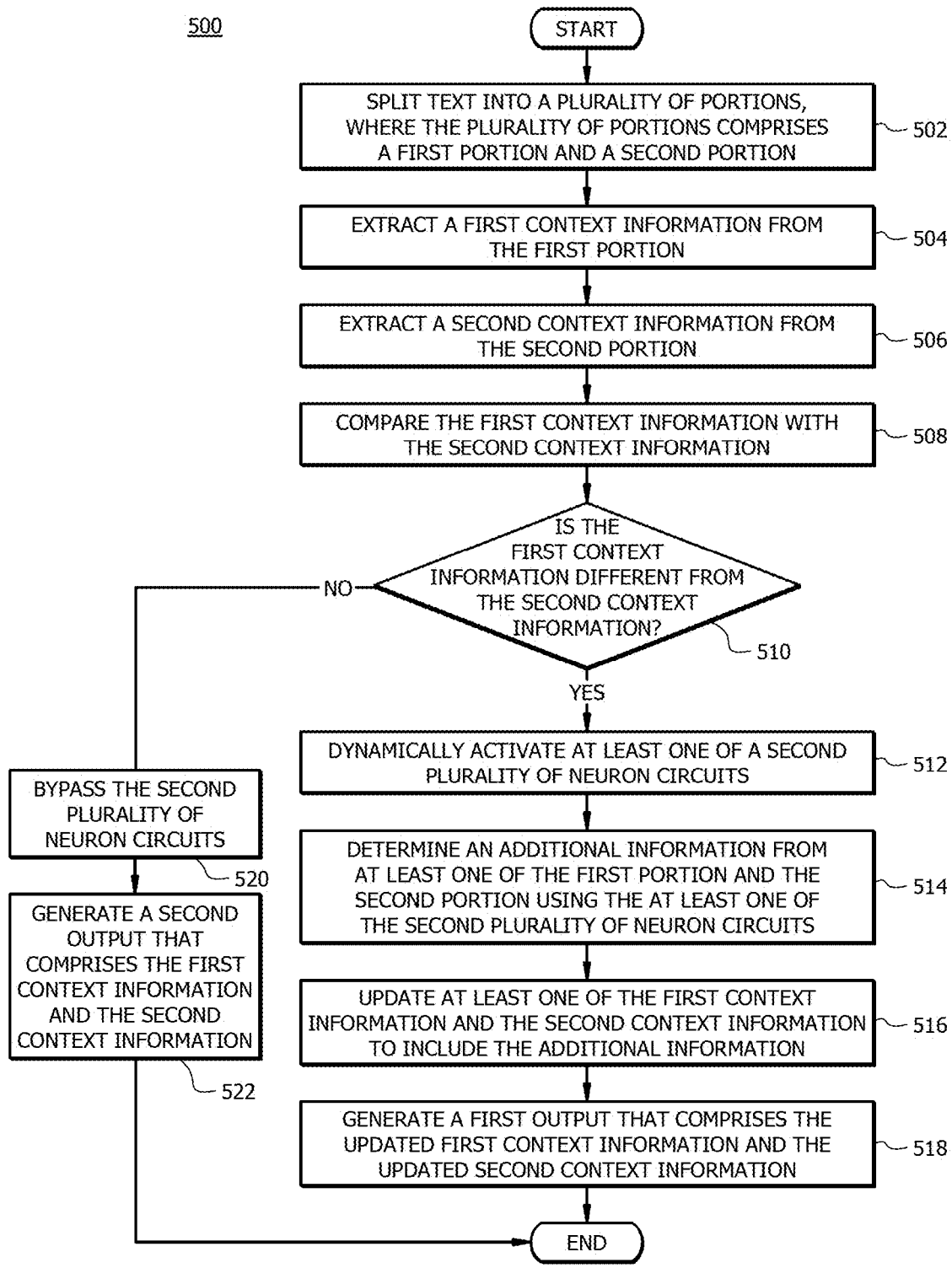
FIG. 5 illustrates an example flowchart of a method for context building from text.

FIG. 5 illustrates an example flowchart of a method 500 for context building from text. Modifications, additions, or omissions may be made to method 500. Method 500 may include more, fewer, or other operations. For example, operations may be performed in parallel or in any suitable order. While at times discussed as the system 100, validation device 140, or components of any of thereof performing operations, any suitable system or components of the system may perform one or more operations of the method 500. For example, one or more operations of method 500 may be implemented, at least in part, in the form of software instructions 150 of FIG. 1, stored on non-transitory, tangible, machine-readable media (e.g., memory 148 of FIG. 1) that when run by one or more processors (e.g., processor 142 of FIG. 1) may cause the one or more processors to perform operations 502-522.

At 502, the processing engine 144 splits text 104 into a plurality of portions 310, where the plurality of portions 310 comprise a first portion 310a and a second portion 310b. The text 104 may be the response message 104 received from a third party device 132 (e.g., first third party device 132a). The text 104 may be interchangeably referred to herein as the response message 104, response 104, or message 104. The process of splitting the text 104 is described in FIG. 3. Each portion 310 may be a sentence from the text 104.

At 504, the processing engine 144 extracts a first context information 330a from the first portion 310a.

For example, the processing engine 144 feeds the first portion 310a to a first neuron circuit 318a, where the first neuron circuit 318a comprises a first circuitry 340 (e.g., implemented by the processor 142 executing the software instruction 150) that comprises a processor, processing resource, memory resource, and/or implemented by software algorithm code configured to determine the first context information 330a from the first portion 310a. In another example, the processing engine 144 may feed the first portion 310a to the neuron circuits 318a-c, where each of the neuron circuits 318a-c comprises a circuitry 340 (e.g., implemented by the processor 142 executing the software instruction 150)) that comprises a processor, a processing resource, a memory resource, and/or implemented by software algorithm code configured to determine any context information 330a-c from any of the portions 310a-c.

At 506, the processing engine 144 extracts a second context information 330b from the second portion 310b. In certain embodiments, extracting the first context information 330a and the second context information 330b is in response to feeding the plurality of portions 310 to a first plurality of neuron circuits 318a-c in the first hidden layer 314a. Each of the plurality of neuron circuits 318a-c comprises a circuitry 340 (e.g., implemented by the processor 142 executing the software instruction 150) configured to determine context information 330 from each of the plurality of portions 310.

For example, the processing engine 144 feeds the second portion 310b to a second neuron circuit 318b, where the second neuron circuit 318b comprises a second circuitry 340 (e.g., implemented by the processor 142 executing the software instruction 150) that comprises a processor, processing resource, memory resource, and/or implemented by software algorithm code configured to determine the second context information 330b from the second portion 310b.

In another example, the processing engine 144 may feed the second portion 310b to the neuron circuits 318a-c, where each of the neuron circuits 318a-c comprises a circuitry 340 (.g., implemented by the processor 142 executing the software instruction 150) that comprises a processor, processing resource, memory resource, and/or implemented by software algorithm code configured to determine any context information 330a-c from any of the portions 310a-c.

The neuron circuits 318a-c are operably coupled (e.g., connected) to each other such that they share data, such as weight values, bias values, context information 330a-c. The first neuron circuit 318a shares the first context information 330a with the second neuron circuit 318b (and the third neuron circuit 318c). The second neuron circuit 318b shares the second context information 330b with the first neuron circuit 318a (and the third neuron circuit 318c).

At 508, the processing engine 144 compares the first context information 330a with the second context information 330b. For example, the processing engine 144 may implement one or more context cells 324, such as the context cells 324a and/or 324b compare the first context information 330a with the second context information 330b. In this process, the processing engine 144 may feed the first context information 330a to the first context cell 324a, where the first context cell 324a comprises a first storage unit 342, and is configured to store the first context information 330a and the second context information 330b. The processing engine 144 may feed the second context information 330b to the second context cell 324b, where the second context cell 324b comprises a second storage unit 342, and is configured to store the second context information 330b and the first context information 330a. Each of the context cells 324a-i may comprise a storage unit 342, and may be configured to store any data, including the context information 330a-c, additional information 332, etc.

At 510, the processing engine 144 determines whether the first context information 330*a* is different from the second context information 330*b*. For example, the processing engine 144 may determine that the first context information 330*a* is different from the second context information 330*b* if it determines that the topic of the first portion 310*a* is different from the topic of the second portion 310*b*. If the processing engine 144 determines that the first context information 330*a* is different from the second context information 330*b*, method 500 proceeds to 512 and performs 512-518. Otherwise, method 500 proceeds to 520 and performs 520-522.

At 512, the processing engine 144 dynamically activates at least one of a second plurality of neuron circuits 320*a-c*. The second plurality of neuron circuits 320*a-c* belong to the second hidden layer 314*b*, and they are different from the neuron circuits 318*a-c* in the first hidden layer 314*a*. For example, the processing engine 144 may activate the neuron circuit 320*a* and/or neuron circuit 320*b* because the difference was between the output of the first neuron circuit 318*a* and the second neuron circuit 318*b*. In another example, the processing engine 144 may activate all of neuron circuits 320*a-c* in the second hidden layer 314*b*. In another example, the processing engine 144 may activate any number and combination of neuron circuits 320*a*,320*b*, 320*c* in the second hidden layer 314*b*. The processing engine 144 may activate the at least one of the second plurality of neuron circuits 320*a-c* by directing or feeding the output of at least one of the neuron circuits 318*a-c* to the at least one of the second plurality of neuron circuits 320*a-c*, similar to that described in FIG. 3.

At 514, the processing engine 144 determines an additional information 332 from at least one of the first portion 310*a* and the second portion 310*b* using the at least one of the second plurality of neuron circuits 320*a-c*. The additional information 332 may include more detail about the at least one of the first context information 330*a* and the second context information 330*b*. For example, because the second hidden layer 314*b* is utilized in addition to the first hidden layer 314*a*, the depth of the hidden layers 314 is increased. This may lead to extracting the additional information 332. The additional information 332 may provide more detail about the context information 330*a* and/or more detail about the context information 330*b*.

At 516, the processing engine 144 updates the at least one of the first context information 330*a* and the second context information 330*b* to include the additional information 332. For example, if the additional information 332 is related to the first context information 330*a*, the processing engine 144 may update the first context information 330*a* to include the additional information 332. In another example, if the additional information 332 is related to the second context information 330*b*, the processing engine 144 may update the second context information 330*b* to include the additional information 332. In another example, if a first portion of the additional information 332 is related to the first context information 330*a* and a second portion of the additional information 332 is related to the second context information 330*b*, the processing engine 144 may update the first context information 330*a* to include the first portion of the additional information 332 and update the second context information 330*b* to include the second portion of the additional information 332. In other examples, the processing engine 144 may update any number and combination of context information 330 determined from the first hidden layer 314*a* to include a respective portion of the additional information 332 that is related to the context information 330.

At 518, the processing engine 144 generates a first output 334*a* that comprises the updated first context information 336*a* and the updated second context information 336*b*. The first output 334*a* may indicate that the updated first context information 336*a* is different from the updated second context information 336*b*. The first output 334*a* may correspond to the context information 152 in a case that the first context information 330*a* is determined to be different from the second context information 330*b*. The first output 334*a* may also indicate the context information 330 of other portions 310.

At 520, the processing engine 144 bypasses the second plurality of neuron circuits 320*a-c*. Thus, if it is determined that there is no difference between the context information 330 determined from various portions 310 of the text 104, the processing engine 144 dynamically bypasses the other hidden layers 314 after the first hidden layer 314*a*. The processing engine 144 may bypass the second hidden layer 314*b* by directing the output of the first hidden layer 314*a* to the context cells 324, similar to that described in FIG. 3 and shown in FIG. 3.

At 522, the processing engine 144 generates a second output 334*b* that comprises the first context information 330*a* and the second context information 330*b*. The second output 334*b* may correspond to the context information 152 in a case that the first context information 330*a* is determined to be the same as the second context information 330*b*. The second output 334*b* may indicate that the first context information 330*a* is the same as the second context information 330*b*. For example, the second output 334*b* may indicate that all context information 330*a-c* are the same as each other.

Although method 500 is described with an example where the first and second portions 310*a* and 310*b* are analyzed, it is understood that a similar operation can be expanded and performed on other portions 310 of the text 104. Thus, in certain embodiments, if is determined that context information 330 is changing between two or more (adjacent and/or not adjacent) portions 310, the processing engine 144 may dynamically activate (e.g., add) an additional hidden layer 314 to the existing hidden layer 314.

In certain embodiments, the number of hidden layers 314 may increase proportionally as the number of context information 330 changes increase between the portions 310. For example, if it is determined that the text 104 has various portions 310 with one context information 330, one hidden layer 314 is used; if it is determined that the text 104 has various portions 310 with three context information 330, three hidden layers 314 are used, and so on. In this manner, the depth (e.g., the number) of the hidden layers 314 may dynamically change depending on the complexity (e.g., the number of context information 330) of the text 104.

Thus, the size of the deep learning context module 160 may change depending on the depth of the hidden layers 314. Therefore, system 100 of FIG. 1 and the deep learning context module 160 reduce the computational complexity for determining the context information 330 of the text 104 at least because the number of hidden neural network layers 314 is dynamically adapted or changed according to the number of context information 330 of the text 104. For example, a lesser number of hidden layers 314 is used for text 104 having lesser different context information 330. Thus, fewer processing and memory resources are used to determine the context information 330. Furthermore, the size of the deep learning context module 160 is reduced.

Furthermore, the neuron circuits in each hidden layer 314 are coupled to each other and thus share data including the context information 330.

These lead to the deep learning context module 160 occupying less memory storage, and thus the system 100 of FIG. 1 improves memory resource utilization of the validation device 140.

In a particular use case, the user 102 may notice that the amount of money in their user account 122 is reduced, and initiate a dispute transaction with the organization 108 by sending a message 106*a* to the validation device 140. The validation device 140 may identify the merchant organization (e.g., via the third party device 132) via which a particular amount of money was removed from the user account 122. The validation device 140 may send the message 106*b* to the merchant organization (e.g., via the third party device 132) to confirm whether a third party 134 has removed the particular amount of money from the user account 122 without the authorization of the user 102. The validation device 140 may receive a response 104 from the third party device 132. The validation device 140 may process the response 104 similar to that described in FIGS. 2-5.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for validating a response based on context information comprising:
   a network interface configured to receive a first message that indicates that a data object is removed from a memory resource via a third party device without an authorization by a user, wherein:
      the memory resource is associated with the user; and
      the third party device is associated with a third party;
   a processor operably coupled to the network interface, and configured to:
      access the first message;
      generate a ticket in response to accessing the first message, wherein the ticket uniquely identifies the first message;
      communicate, to the third party device, a second message that indicates whether the third party confirms a removal of the data object without the authorization by the user;
      receive a response message from the third party device;
      extract context information from the response message, wherein the context information represents a meaning of the response message;
      determine that the response message is valid based at least in part upon the context information; and
      in response to determining that the response message is valid:
         recommend one or more actions to be performed on the memory resource;
         receive a confirmation that the one or more actions are performed; and
         close the ticket.

2. The system of claim 1, wherein, the one or more actions comprise retrieving the data object from the third party device and storing the data object in the memory resource, in response to the context information indicating that the third party acknowledges the removal of the data object without the authorization by the user.

3. The system of claim 1, wherein, the one or more actions comprise indicating to the user that the data object was not removed from the memory resource without the authorization by the user, in response to the context information indicating that the third party does not acknowledge the removal of the data object without the authorization by the user.

4. The system of claim 1, wherein the processor is further configured to:
   determine that the response message is invalid; and
   in response to determining that the response message is invalid, communicate one or more third messages to the third party device, until a second response message is received from the third party device and is determined to be valid.

5. The system of claim 1, wherein the response message is determined to be invalid if it is determined that the response message:
   is an automatically-generated response;
   only comprises an acknowledgement message;
   is associated with another data object; or
   is associated with another memory resource.

6. The system of claim 1, wherein generating the ticket is further in response to determining that the first message is received less than a threshold number of days before the removal of the data object.

7. The system of claim 1, wherein the processor is further configured to determine that the third party device removed the data object from the memory resource based at least in part upon historical data communications between the memory resource and the third party device.

8. A method for validating a response based on context information comprising:
   receiving a first message that indicates that a data object is removed from a memory resource via a third party device without an authorization by a user, wherein:
      the memory resource is associated with the user; and
      the third party device is associated with a third party;
   accessing the first message;
   generating a ticket in response to accessing the first message, wherein the ticket uniquely identifies the first message;

communicating, to the third party device, a second message that indicates whether the third party confirms a removal of the data object without the authorization by the user;

receiving a response message from the third party device;

extracting context information from the response message, wherein the context information represents a meaning of the response message;

determining that the response message is valid based at least in part upon the context information; and in response to determining that the response message is valid:
  recommending one or more actions to be performed on the memory resource;
  receiving a confirmation that the one or more actions are performed, and
  closing the ticket.

9. The method of claim 8, wherein, the one or more actions comprise retrieving the data object from the third party device and storing the data object in the memory resource, in response to the context information indicating that the third party acknowledges the removal of the data object without the authorization by the user.

10. The method of claim 8, wherein, the one or more actions comprise indicating to the user that the data object was not removed from the memory resource without the authorization by the user, in response to the context information indicating that the third party does not acknowledge the removal of the data object without the authorization by the user.

11. The method of claim 8, further comprising:
determining that the response message is invalid; and
in response to determining that the response message is invalid, communicating one or more third messages to the third party device, until a second response message is received from the third party device and is determined to be valid.

12. The method of claim 8, wherein the response message is determined to be invalid if it is determined that the response message:
  is an automatically-generated response;
  only comprises an acknowledgement message;
  is associated with another data object; or
  is associated with another memory resource.

13. The method of claim 8, wherein generating the ticket is further in response to determining that the first message is received less than a threshold number of days before the removal of the data object.

14. The method of claim 8, further comprising determining that the third party device removed the data object from the memory resource based at least in part upon historical data communications between the memory resource and the third party device.

15. A non-transitory computer-readable medium storing instructions that when executed by a processor, cause the processor to:
  receive a first message that indicates that a data object is removed from a memory resource via a third party device without an authorization by a user, wherein:
    the memory resource is associated with the user; and
    the third party device is associated with a third party;
  access the first message;
  generate a ticket in response to accessing the first message, wherein the ticket uniquely identifies the first message;
  communicate, to the third party device, a second message that indicates whether the third party confirms a removal of the data object without the authorization by the user;
  receive a response message from the third party device;
  extract context information from the response message, wherein the context information represents a meaning of the response message;
  determine that the response message is valid based at least in part upon the context information; and
  in response to determining that the response message is valid:
    recommend one or more actions to be performed on the memory resource;
    receive a confirmation that the one or more actions are performed, and
    close the ticket.

16. The non-transitory computer-readable medium of claim 15, wherein, the one or more actions comprise retrieving the data object from the third party device and storing the data object in the memory resource, in response to the context information indicating that the third party acknowledges the removal of the data object without the authorization by the user.

17. The non-transitory computer-readable medium of claim 15, wherein, the one or more actions comprise indicating to the user that the data object was not removed from the memory resource without the authorization by the user, in response to the context information indicating that the third party does not acknowledge the removal of the data object without the authorization by the user.

18. The non-transitory computer-readable medium of claim 15, wherein the instructions when executed by the processor, further cause the processor to:
  determine that the response message is invalid; and
  in response to determining that the response message is invalid, communicate one or more third messages to the third party device, until a second response message is received from the third party device and is determined to be valid.

19. The non-transitory computer-readable medium of claim 15, wherein the response message is determined to be invalid if it is determined that the response message:
  is an automatically-generated response;
  only comprises an acknowledgement message;
  is associated with another data object; or
  is associated with another memory resource.

20. The non-transitory computer-readable medium of claim 15, wherein generating the ticket is further in response to determining that the first message is received less than a threshold number of days before the removal of the data object.

* * * * *